Dec. 20, 1960     O. G. STEEDE     2,964,846
LATCH FOR A GRASS SHEARS
Filed Nov. 2, 1959
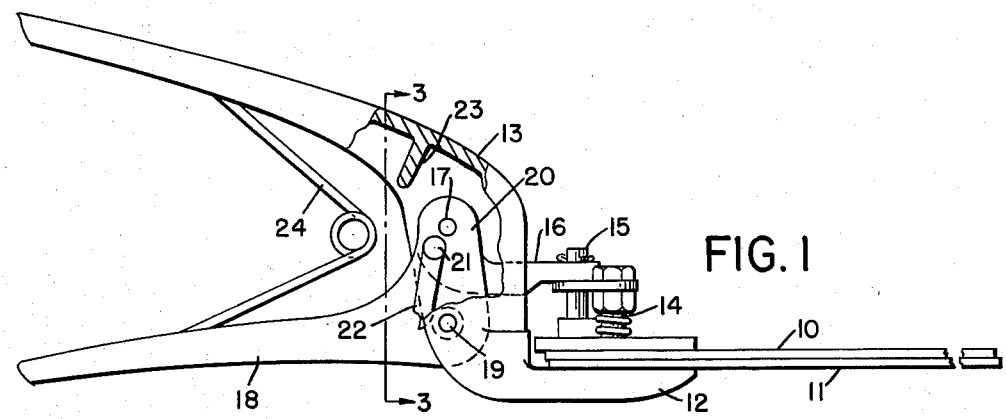
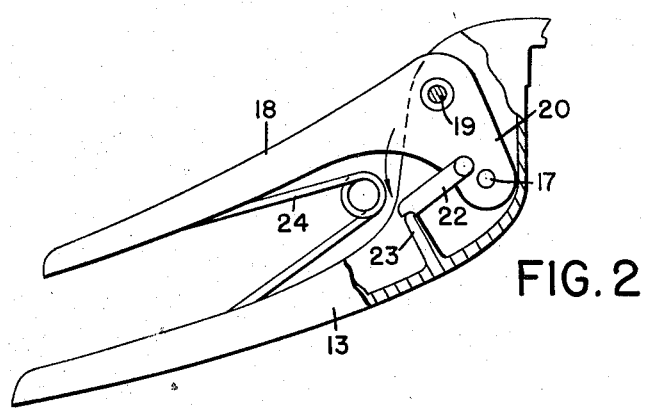
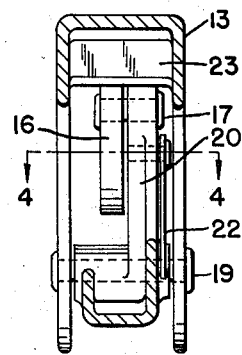
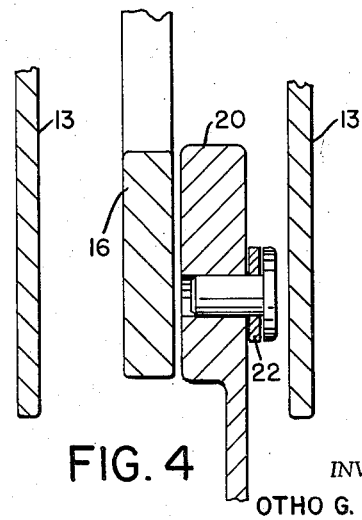
INVENTOR
OTHO G. STEEDE
BY
ATTORNEY

United States Patent Office

2,964,846
Patented Dec. 20, 1960

2,964,846

LATCH FOR A GRASS SHEARS

Otho G. Steede, Alliance, Ohio, assignor to The Lewis Engineering and Manufacturing Company, Alliance, Ohio Filed Nov. 2, 1959, Ser. No. 850,338

5 Claims. (Cl. 30—262)

This invention relates to a grass shears and more particularly to a latch for holding the shears blades in closed position when the shears is not in use. The principal object of the invention is a provision of a simple and inexpensive latch for engaging respective portions of the handles of a grass shears to hold the same in desired position.

A further object of the invention is the provision of a latch for a grass shears that will operate by gravity so that the blades may be latched in closed position by merely moving the handles of the grass shears to an appropriate closed position and inverting the shears to actuate the latch.

A further object of the invention is the provision of a latch for a grass shears which may be positioned in the hidden recesses of the handles and in a location incapable of being manually actuated.

A still further object of the invention is a provision of a latch for a grass shears that will hold the grass shears in latched position against the tension of the spring positioned between the handles of the grass shears and normally urging the same to open position and which latch may be released automatically by moving the handles toward one another in slight degree to free the latch from tension and permit gravity to move the latch to unlatched position.

The latch for a grass shears disclosed herein comprises an improvement of the art of latching the handles and/or the blades of a grass shears and similar tools in desirable position. It is customary in the art to produce grass shears and similar tools with blades and handles which are spring urged to normally open position. Such grass shears and similar tools are difficult to package with the blades in open position and are frequently dangerous in that the sharp cutting edges of the blades are exposed. It has become customary to provide grass shears with various types of latches which will hold the blades in closed position whereby the cutting edges are engaged or overlapped and thereby preventing a person packing the same or handling the same from being accidentally cut. In the latches heretofore known in the art, mechanical constructions have been employed which required manual operation, for example, that shown in my Patent No. 2,638,669 of May 19, 1953.

Such constructions have been widely used and require the manual operation by the person holding the grass shears. The present invention achieves the same result with a less expensive construction and one which is operable by merely turning the shears upside down.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation of a grass shears with parts broken away and parts in cross section and showing the blades and handles in open, unlatched position.

Figure 2 is a side elevation of the handle portions of the shears shown in Figure 1 inverted with parts broken away and parts in cross section, showing the handles in closed and latched position.

Figure 3 is an enlarged detail on line 3—3 of Figure 1.

Figure 4 is an enlarged cross section on line 4—4 of Figure 3.

By referring to the drawings and Figures 1 and 2 in particular it will be seen that a grass shears has been disclosed which has a pair of blades 10 and 11 the blade 11 being secured to a forward projection 12 of an upper handle 13. The blade 10 is pivotally mounted on the forward projection 12 of the upper handle 13 on a pivot 14 as will be understood by those skilled in the art. A pin 15 is mounted on the blade 10 in spaced relation to the pivot 14 and pivotally engages a link 16 which in turn is pivoted on a transverse pivot pin 17 positioned between the downturned sides of the upper handle 13.

The lower handle 18 is pivoted by a transverse pivot pin 19 to the lower portion of the upper handle 13 and an upwardly projecting portion of the lower handle 18 forms a lever extension 20. A pivot pin 21 is positioned in the lever extension 20 and projects from one side thereof and loosely mounts a latch arm 22 which normally depends therefrom as seen in Figure 1.

The upper arm 13 is provided with a transverse web 23 between the downturned sides thereof as best seen in Figures 1 and 2 and 3 of the drawings, and it will be observed that the end of the latch arm 22 is notched so that it may register with the outermost edge of the web 23 when it is moved into position adjacent the same as will occur when the handles 13 and 18 are moved toward one another to closed position and inverted as shown in Figure 2 of the drawings.

As seen in Figure 2 a spring 24 between the handles 13 and 18 has been tensioned as the handles 13 and 18 move toward one another and the latch arm 22 has swung downwardly by gravity, as shown by the arrow, so that the notch in the outer end thereof engages the edge of the web 23. Upon the handles 13 and 18 being released the tendency of the spring 24 to move the lever extension 20 toward the web 23 is resisted by the latch arm 22 so that the handles 13 and 18 and hence the blades 10 and 11 are held in closed position. In order to release the latch arm 22 the grass shears are held in normal upright position, as shown in Figure 1, and slight tension is applied to the handles 13 and 18 whereupon the lever extension 20 on the handle 18 will move slightly away from the web 23 and permit the latch arm 22 to fall by gravity to the position shown in Figure 1 whereupon the release of tension on the handles 13 and 18 will permit the spring 24 to move the same to open position along with the blades 10 and 11.

It will thus be seen that a simple automatically-operated latch for a grass shears has been disclosed which comprises the latch arm 22 and the web 23 arranged for interengagement at a time when the lever extension 20 of the handle 18 is in substantially maximum spaced relation thereto. In Figures 3 and 4 of the drawing enlarged details of the respective parts of the grass shears may be seen in transverse section as taken on Figure 1 of the drawings and wherein the latch arm 22 is disengaged.

It will thus be seen that a simple and effective gravity actuating latch for a grass shears has been disclosed and having thus described my invention what I claim is:

1. In a grass shears having pivoted blades and handles connected to said blades for moving the same one of said handles being U-shaped in cross section; a transverse web on said handle of U-shaped cross section and a lever extension on the other one of said handles extending toward said transverse web on said first-mentioned handle, an arm pivoted freely to said lever extension so as to be movable in an arc for end engagement with said transverse web on said first-mentioned handle, a pivot pin engaging said handles whereby said handles are pivoted to one another.

2. The improvement in a grass shears set forth in claim 1 and wherein said pivot pin is positioned through said other one of said handles at a point thereon adjacent said lever extension.

3. The improvement in a grass shears set forth in claim 1 and wherein one of said blades is fixed with respect to said first-mentioned handle and wherein said other one of said handles comprises a member positioned in end to end relation to said fixed blade, and wherein said lever extension is positioned on the end of said member adjacent said fixed blade.

4. In a grass shears having pivoted blades and handles connected thereto for moving the same; one of said handles comprising a member having a cross sectionally U-shaped arcuate section and an offset straight section with an intermediate right angular section therebetween, a transverse web on said arcuate section of said handle, the other one of said handles comprising an elongated straight member with an upstanding lever extension on one end, a pivot pin engaging said handles so that said intermediate section and said lever extension are positioned on spaced parallel planes with the outermost end of said lever extension movable in an arc based on said pivot pin, a movable arm, a secondary pivot pin engaging said arm adjacent one end thereof and engaging said lever extension at a point thereon spaced with respect to said pivot pin whereby the other end of said arm will normally engage said web on said first-mentioned handle when said lever extension is moved away therefrom.

5. In a grass shears having pivoted blades and handles connected thereto for moving the same; one of said handles comprising a member having an arcuate section and an offset straight section with an intermediate right angular section therebetween, a projection on said arcuate section of said handle extending toward the other one of said handles, the other one of said handles comprising an elongated straight member with an upstanding lever extension on one end, a pivot pin engaging said handle so that said intermediate section and said lever extension are positioned on spaced parallel planes with the outermost end of said lever extension movable in an arc based on said pivot pin, a movable arm, a secondary pivot pin engaging said arm adjacent one end thereof and engaging said lever extension at a point thereon spaced with respect to said pivot pin whereby the other end of said arm will normally engage said projection on said first-mentioned handle when said lever extension is moved away therefrom, said arm being movable by gravity toward and away from said projection.

References Cited in the file of this patent
UNITED STATES PATENTS

| | | |
|---|---|---|
| 309,888 | Shepard | Dec. 30, 1884 |
| 1,529,916 | Rauch | Mar. 17, 1925 |
| 1,546,317 | Rogers | July 14, 1925 |
| 2,638,669 | Steede | May 19, 1953 |
| 2,650,423 | Phillips | Sept. 1, 1953 |